United States Patent
Kienzle et al.

(10) Patent No.: US 8,844,041 B1
(45) Date of Patent: Sep. 23, 2014

(54) DETECTING NETWORK DEVICES AND MAPPING TOPOLOGY USING NETWORK INTROSPECTION BY COLLABORATING ENDPOINTS

(75) Inventors: Darrell Kienzle, Vienna, VA (US); William Gauvin, Leominster, MA (US); Matthew Elder, Germantown, MD (US); Robert Walters, Southern Shores, NC (US); Adam Schepis, Milford, MA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 501 days.

(21) Appl. No.: 12/713,606

(22) Filed: Feb. 26, 2010

Related U.S. Application Data (60) Provisional application No. 61/294,403, filed on Jan. 12, 2010.

(51) Int. Cl.
G06F 11/30 (2006.01)
G06F 15/173 (2006.01)
H04L 12/24 (2006.01)
H04L 12/751 (2013.01)
H04L 29/06 (2006.01)

(52) U.S. Cl.
CPC ............... *H04L 41/12* (2013.01); *H04L 45/02* (2013.01); *H04L 63/1433* (2013.01)
USPC .............................. 726/25; 726/23; 709/224

(58) Field of Classification Search
CPC ..... H04L 41/12; H04L 45/02; H04L 63/1433; H04L 2463/146
USPC ................. 709/224, 223, 220; 726/25, 22, 23
See application file for complete search history.

(56) References Cited

U.S. PATENT DOCUMENTS

| | | | | |
|---|---|---|---|---|
| 6,003,074 A | * | 12/1999 | Vasconcellos | 709/220 |
| 6,560,720 B1 | * | 5/2003 | Chirashnya et al. | 714/32 |
| 6,952,421 B1 | * | 10/2005 | Slater | 370/401 |
| 6,970,924 B1 | * | 11/2005 | Chu et al. | 709/224 |
| 7,065,573 B2 | * | 6/2006 | Byrnes | 709/224 |
| 7,086,089 B2 | * | 8/2006 | Hrastar et al. | 726/22 |
| 7,296,079 B2 | * | 11/2007 | Motoyama et al. | 709/230 |
| 7,340,536 B2 | * | 3/2008 | Valentine et al. | 709/252 |

(Continued)

OTHER PUBLICATIONS

Yao et al. "Topology Inference in the Presence of Anonymous Routers", IEEE INFOCOM 2003. Mar. 2003. 11 pgs.*

(Continued)

*Primary Examiner* — Zachary A Davis
(74) *Attorney, Agent, or Firm* — Fenwick & West LLP (57) ABSTRACT

Detection of network devices (e.g., stealth devices) and mapping network topology are performed via network introspection by collaborating endpoints/nodes. The method includes receiving (e.g., by a node on a network) an assignment to be a supernode that will manage multiple agents of a subnetwork within an overall network. This assigned supernode instructs two or more of the agents to perform a set of network traffic fingerprinting tests of the subnetwork by passing information across the subnetwork to each other. The supernode receives results of the tests from the clients and detects one or more intermediate devices located between the clients based on an effect of the intermediate devices on the information passed between the clients. The supernode can further map the topology of the subnetwork (including the detected devices) which can be used in mapping the overall network topology.

20 Claims, 5 Drawing Sheets

(56) References Cited

U.S. PATENT DOCUMENTS

| | | | |
|---|---|---|---|
| 7,467,067 B2* | 12/2008 | Marvasti | 702/186 |
| 7,493,388 B2* | 2/2009 | Wen et al. | 709/224 |
| 7,660,269 B2* | 2/2010 | Aoki et al. | 370/255 |
| 7,660,891 B2* | 2/2010 | Black | 709/224 |
| 7,747,674 B2* | 6/2010 | Barkai et al. | 709/202 |
| 7,925,729 B2* | 4/2011 | Bush et al. | 709/223 |
| 8,099,760 B2* | 1/2012 | Cohen et al. | 726/2 |
| 2002/0124079 A1* | 9/2002 | Pulsipher | 709/224 |
| 2005/0047350 A1* | 3/2005 | Kantor et al. | 370/254 |
| 2007/0180109 A1* | 8/2007 | Brim | 709/225 |
| 2007/0201385 A1* | 8/2007 | Goto et al. | 370/254 |
| 2009/0199298 A1* | 8/2009 | Miliefsky | 726/25 |
| 2009/0290513 A1* | 11/2009 | Swan | 370/255 |

OTHER PUBLICATIONS

"LLTD: Link Layer Topology Discovery Protocol," A Windows Rally™ Specification, Microsoft® Windows, Sep. 15, 2006, 68 pages.

"Camus: Mapping Cyber Assets to Missions and Users," Secure Decisions Portal, Applied Visions, Inc., 2009, 2 pages [Online] [Retrieved on Mar. 30, 2010] Retrieved from the Internet<URL:http://www.securedecisions.com/camus>.

"Chapter 15. Nmap Reference Guide," Nmap.org, 3 pages, [Online] [Retrieved on Mar. 30, 2010] Retrieved from the Internet<URL:http://nmap.org/book/man.html#man-description>.

Claffy, K. et al., "Internet Mapping: from Art to Science," IEEE DHS CATCH Conference, Mar. 2009, 7 pages.

Dabek, F. et al., "Vivaldi: A Decentralized Network Coordinate System," SIGCOMM '04, Aug.-Sep. 2004, 12 pages.

Downey, A. "Using Pathchar to Estimate Internet Link Characteristics," ACM SIGCOMM '99, Aug.-Sep. 1999, 10 pages.

Endsley, M., "Theoretical Underpinnings of Situational Awareness: A Critical Review," In Situation Awareness Analysis and Measurement, M. Endsley and D. Garland (Eds.), 2000, 24 pages.

Eriksson, B. et al., "Network Discovery from Passive Measurements," ACM SIGCOMM '08, Aug. 2008, 12 pages.

Grimaila, M.R., "The Need for Real Time Cyber Incident Mission Impact Assessment," IEEE Intelligence and Security Informatics Conference 2009, Jun. 11, 2009, 41 pages.

Hernacki, B. et al., "An Overview of Network Evasion Methods," Elsevier Information Security Technical Report, Oct. 2005, 11 pages, vol. 10, Iss. 3.

Hoagland, J., "The Teredo Protocol: Tunneling Past Network Security and Other Security Implications," Symantec Response Whitepaper, Nov. 2006, 35 page, [Online] [Retrieved on Mar. 30, 2010] Retrieved from the Internet<URL:http://www.symantec.com/avcenter/reference/Teredo_Security.pdf>.

"HP Network Management Center Brochure," Rev. Oct. 1, 2009, 4 pages, Hewlett-Packard Development Company, L.P.

Jin, X, et al., "Network Topology Inference Based on End-to-End Measurements," IEEE Journal on Selected Areas in Communications, Dec. 2006, pp. 2182-2195, vol. 24, No. 12.

Katabi, D. et al., "A Passive Approach for Detecting Shared Bottlenecks," IEEE International Conference on Computer Communications and Networks (ICCCN 2001), Oct. 2001, pp. 1-10.

Kohno, T. et al., "Remote Device Fingerprinting," IEEE Transactions on Dependable and Secure Computing, Apr.-Jun. 2005, May 25, 2005, 29 pages, vol. 2 No. 2.

Mani, M. et al., "Super Nodes Positioning for P2P IP Telephony over Wireless Ad-hoc Networks," 6th International Conference on Mobile and Ubiquitous Multimedia (MUM 2007), Dec. 2007, 6 pages.

"Nmap—Free Security Scanner for Network Exploration & Security Audits," Nmap.org, 2 pages, [Online] [Retrieved on Mar. 30, 2010].

Prasad, R. et al., "Bandwidth Estimation: Metrics, Measurement, Techniques, and Tools," IEEE Network, Nov.-Dec. 2003, pp. 27-35.

Tsang, Y. et al., "On the Performance of Round Trip Time Network Tomography," IEEE International Conference on Communications (ICC '06), Jun. 2006, pp. 1-6.

Ubuntu Manuals, "Macof—flood a switched LAN with random MAC addresses," Ubuntu Manpage Repository, 2009, 1 page [Online] [Retrieved on Mar. 30, 2010] Retrieved from the Internet <URL:http://manpages.ubuntu.com/manpages/karmic/man8/macof.8.html>.

Yao, B. et al., "Topology Inference in the Presence of Anonymous Routers," IEEE Infocom 2003, Apr. 2003, pp.

* cited by examiner

DETECTING NETWORK DEVICES AND MAPPING TOPOLOGY USING NETWORK INTROSPECTION BY COLLABORATING ENDPOINTS

CROSS-REFERENCE TO RELATED APPLICATIONS

This application claims the benefit of U.S. Provisional Application No. 61/294,403, filed on Jan. 12, 2010, Entitled "Determining Systems Within Topology of an Enterprise Using Network Introspection by Collaborating Endpoints," the entire disclosure of which is hereby incorporated by reference herein in its entirety for all purposes, including any appendices or attachments thereof.

BACKGROUND OF THE INVENTION

1. Field of the Invention

This invention pertains in general to computer security, and more specifically to detecting network devices and to mapping the topology of networks using network introspection by collaborating nodes/endpoints.

2. Description of the Related Art

In order to effectively protect networks, it is necessary to gather information about these networks and determine their configuration. Situational awareness for system and network administrators in large, distributed enterprise organizations requires detailed understanding and information about the networks supporting the organization's information systems and the assets running on those networks. Networks are constantly changing as assets come and go and network elements are configured and reconfigured to provide required services.

Yet, understanding networks is a difficult problem. Information regarding the network, including network topology and configuration, is difficult to collect and costly to maintain due to the different types of network equipment, each potentially requiring proprietary software for administration and monitoring. There are also significant challenges in the processes and tools that acquire and continuously maintain the relevant data, and these tools/protocols for network management are dependent upon proper configuration and administrative control. Further, production networks tend to grow by accretion, with branches, subnetworks, and servers added on an as-needed basis. As networks get larger, responsibility (and authority) over such networks tends to become more convoluted. In large enterprises, the responsibility for security is generally divided into entirely different organizations, and different aspects and regions of the networks are further divided. Limited and/or out-of-date views severely hamper the ability to detect the presence of attacks and attackers (including potentially malicious "stealth" devices), or result in networks that are needlessly open. In addition, the process for collecting topology information is so labor intensive that mapping occurs sporadically and quickly becomes out of date.

Current technologies in the areas of network mapping, network coordinate systems, bandwidth estimation, and network tomography have been unable to solve these problems. These approaches are commonly applied to the problem at the scale of mapping the Internet and do not utilize key advantages that one has when mapping the network topology of a managed enterprise. Even products that provide some enterprise-scale network-management capabilities generally use network-management protocols to communicate directly with network devices and ask them for information about the systems with which they have communicated. These products require administrators to know which devices form the backbone of their network, and do not provide management privileges over, or the ability to communicate with, all forms of network devices. Further, these products cannot identify systems that fail to identify themselves in response to identification requests or that report themselves as one entity, but may actually be a very different entity (e.g., a stealth or rogue device). Other tools rely on various protocols to build a picture of what is actually present on the network, but these point-in-time scans quickly become out of date and also tend to focus on mapping of the entire Internet.

Therefore, there is a need in the art for a solution that reliably and securely detects network devices (including devices that may be hiding from detection or reporting themselves as something different from what they actually are), and that can also map the topology of regularly changing networks in real-time and can accurately maintain this topology over a period of time.

DISCLOSURE OF INVENTION

The above and other needs are met by a computer-implemented method, computer system, and computer-readable storage medium in which a network detection sensor detects devices in a subnetwork based on communication between agents and maps a topology of the subnetwork. Embodiments of the computer-implemented method comprise receiving an assignment (e.g., to be a supernode managing multiple agents of a subnetwork), and instructing two or more agents to perform a set of network traffic fingerprinting tests of the subnetwork (e.g., by passing information across the subnetwork to each other for detecting whether any intermediate devices are located between the agents). The method also includes receiving results of these tests from the agents and detecting one or more intermediate devices located between the agents based on the effect of the devices on the information passed between the agents. The method also includes mapping (or modifying a map of) the topology of the subnetwork including the intermediate devices detected.

Embodiments of the computer-readable storage medium store executable computer program instructions for detecting devices in a subnetwork and mapping network topology The instructions comprise instructions for performing the steps of receiving an assignment (e.g., to be a supernode), and instructing two or more agents to perform a set of network traffic fingerprinting tests of the subnetwork. The instructions further comprise instructions for receiving results of these tests from the agents and detecting one or more intermediate devices located between agents based on the effect of the devices on the information passed between the agents. The instructions also include instructions for mapping (or modifying a map of) the topology of the subnetwork including the intermediate devices detected.

Embodiments of the computer system comprise a system for detecting devices in a subnetwork and mapping network topology. An assignment module receives an assignment (e.g., to be a supernode), and an instruction module instructs two or more agents to perform a set of network traffic fingerprinting tests of the subnetwork. A results-receiving module receives results of these tests from the agents and a detection module detects one or more intermediate devices located between the agents based on the effect of the devices on the information passed between the agents. A mapping module maps (or modifies a map of) the topology of the subnetwork including the intermediate devices detected.

The features and advantages described in this disclosure and in the following detailed description are not all-inclusive, and particularly, many additional features and advantages will be apparent to one of ordinary skill in the relevant art in view of the drawings, specification, etc., hereof. Moreover, it should be noted that the language used in the specification has been principally selected for readability and instructional purposes, and may not have been selected to delineate or circumscribe the inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Management Architecture

Figure 1:
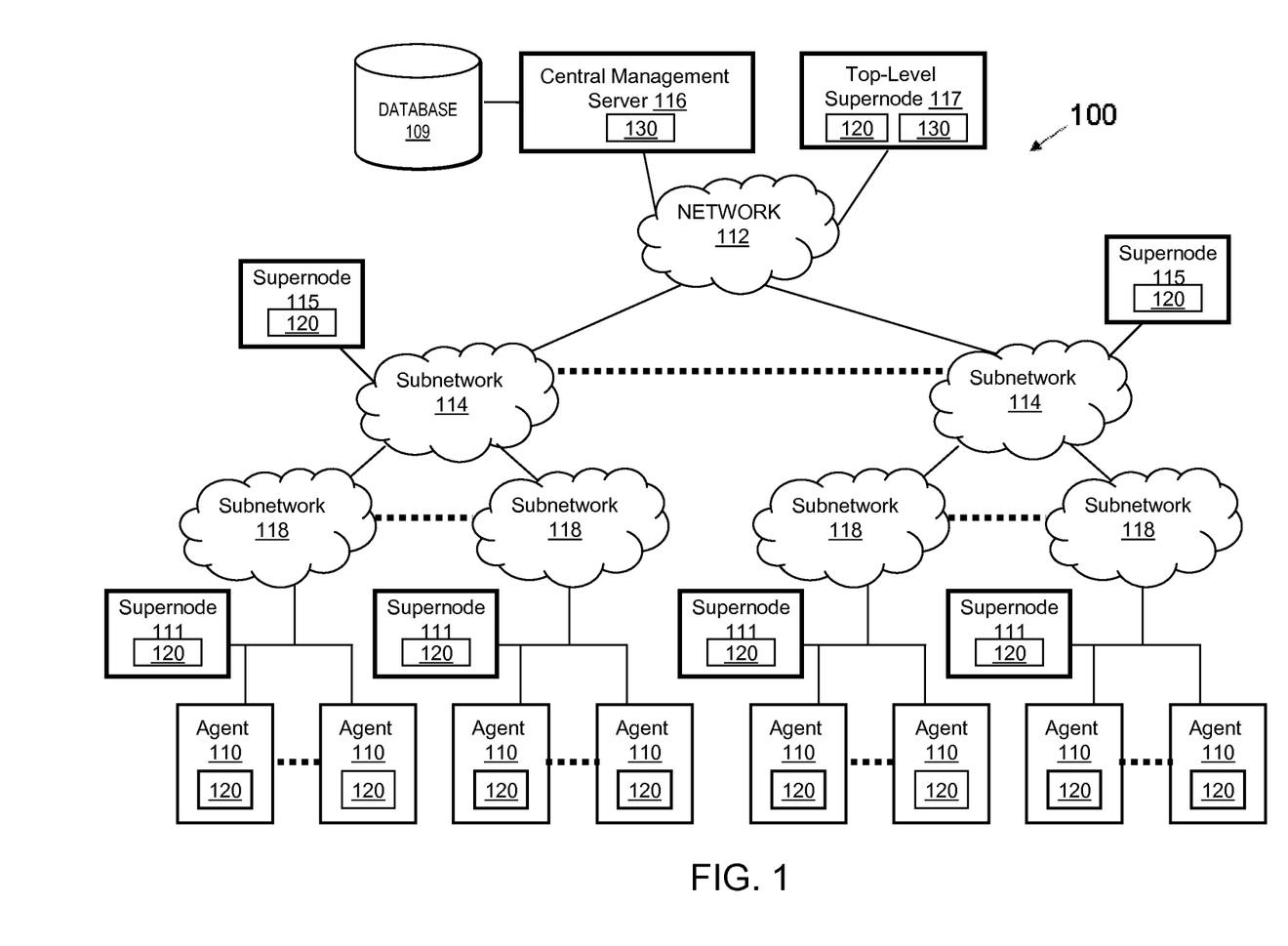
FIG. 1 is a high-level block diagram illustrating an example of a networking environment 100, according to one embodiment of the present invention.

FIG. 1 is a high-level block diagram illustrating a networking environment/system 100 according to an embodiment. The network mapping system 100 can employ a managed overlay network for its management architecture, including a hierarchy of nodes with various layers of management. At the lowest level in FIG. 1 are multiple subnetworks 118, each having various nodes assigned to that subnetwork 118. Specifically, each subnetwork 118 has a supernode 111 managing the agents on that subnetwork 118 and various agents 110 on each node on that subnetwork 118. The supernodes 115 at the next level up in the hierarchy each manage a subnetwork 114 that includes some of the lower level subnetworks 118 containing the supernodes 111 and agents 110. The central management server 116 and top-level supernode 117 sit at the topmost layer of the hierarchy and are responsible for mapping the entire network 112 that includes the various subnetworks 114, 118 lower in the hierarchy. In this arrangement, the agents 110 can receive instructions from their supernodes 111, and the supernodes 111 can receive instructions from various mid-level supernodes 114, which can receive instructions from the top-level supernode 117 or from the server 116. Only a limited number of agents 110 and supernodes 111, 115, 117 are shown in FIG. 1 in order to simplify and clarify the description. However, embodiments of the computing environment 100 can have thousands or millions of agents 110 and supernodes 111, 115, 117 associated with many subnetworks 114, 118 (as represented by the ellipses in FIG. 1), as well as multiple servers 116. In addition, the number of layers can vary, and there can be many additional layers of the networking environment 100 including many different subnetworks besides subnetworks 118, 114 shown in FIG. 1. As used herein, a "node" refers to a connection point or a communication endpoint on a network, and so can be any computer or device on a network, such as those hosting the agents 110 and supernodes 111, 115, 117.

The central management server 116 serves information or content to agents 110 and supernodes 111, 115, 117 via the network 112 and via subnetworks 118, 114. In one embodiment, the server 116 is located at a website provided by SYMANTEC CORPORATION, although the server can also be provided by another entity. In another embodiment, the server 116 is a top-level server or management server in an enterprise. The server 116 can include a database 109 storing information (e.g., a fingerprint database 109 storing fingerprint data identifying network devices, a mapping database for storing network topology mapping data) and a web server for interacting with agents 110 and supernodes 111, 115, 117. The database 109 is shown as being connected to the server 116, but various nodes may have access to this database 109 or a portion of it either via the server, via the top-level supernode, or directly. The server 116 can send information (e.g., instructions for performing network testing, software updates) across the network 112 and to the agents 110 or supernodes 111, 115, 117. The server 116 can also collect or receive information from the agents 110 and supernodes 111, 115, 117 (e.g., reports of network testing results; data regarding mapping of subnetworks). One or more of the functions of the server 116 can also be executed on the agent 110, on supernodes 111, 115, 117, or in a cloud computing environment. As used herein, cloud computing refers to a style of computing in which dynamically scalable and often virtualized resources are provided as a service over the Internet.

The agents 110 are computers or other electronic devices that can interact with a supernode 111, 115, 117, and with other agents 110. In some case, the agents 110 interact directly or indirectly (via supernodes 111) with higher-level supernodes 115, 117 and the central management server 116. These agents 110 are "managed clients" in that they are endpoint systems operating within an enterprise, under control of, and managed by, the enterprise's system administrators. The supernodes 111, 115, 117 are also computers or other electronic devices that can interact directly or indirectly with the central management server 116, with other supernodes, and with the agents 110. Further, the supernodes 111, 115, 117 are also "managed clients" that have been temporarily assigned, through a selection process, to act as supernodes that will perform network data collection and network mapping. The agents 110 and supernodes 111, 115, 117 for example, can be personal computers executing a web browser that allows the user to browse and search for information available at a website associated with the server 116. In other embodiments, one or more of the agents 110 or supernodes 111, 115, 117 are network-capable devices other than a computer, such as a personal digital assistant (PDA), a mobile telephone, a pager, a television "set-top box," etc. Any of the agents 110 or supernodes 111, 115, 117 could also be a server. The agents 110 and supernodes 111, 115, 117 preferably execute an operating system (e.g., LINUX®, one of the versions of MICROSOFT WINDOWS®), which controls the operation of the computer system, and executes one or more application programs.

The agents 110 and the supernodes 111, 115, 117 can perform activities and make requests for or otherwise acquire information (e.g., instructions to perform network testing, software updates). These can be requests to the server 116, to the supernodes 111, 115, 117 or other computers. The agents 110 and the supernodes 111, 115, 117 can also send information (e.g., reports of network testing results, data regarding mapping of subnetworks). The information can be sent to the server 116, supernodes 111, 115, 117 or other computers. In some embodiments, one or more of the supernodes 111, 115, 117 are agents that have been designated to act as supernodes that are responsible for mapping a portion of or all of a network, including managing other agents 110. Thus, whether a node in the middle of the hierarchy is a supernode or an agent can be a matter of perspective, since a given node, such as node 111 of FIG. 1, can be a supernode relative to the agents 110, but can be an agent 110 relative to supernodes 115, 117.

The network 112 and subnetworks 114, 118 enable communications among the entities connected to them. In one embodiment, the network 112 is the Internet, and one or more of the subnetworks 114, 118 are intranets or networks within intranets. In another embodiment, the network 112 is an intranet, and the subnetworks 114, 118 are site networks or other smaller divisions of networks within the intranet. The subnetworks 114, 118 can include a small group of agents 110 (e.g., two or more) within a network 112 or they can include a larger group of agents 110 (e.g., hundreds, thousands, millions of agents 110). The networks 112, 114, 118 can use standard communications technologies and/or protocols. Thus, the network 112, 114, 118 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the networks 112, 114, 118 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the networks 112, 114, 118 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, all of the agents 110 and supernodes 111, 115 execute a network detection sensor 120 for detecting devices in a subnetwork 114, 118 within an overall network 112 based on communication between agents 110. Also in the embodiment of FIG. 1, the central management server 116 executes a network mapping manager 130. In some embodiments, the top-level supernode can execute a network detection sensor 120 or a network mapping manager 130, or both. The network detection sensor 120 and network mapping manager 130 can be discrete application programs, or can be integrated into another application program or the operating system of the agents 110, supernodes 111, 115, 117 or server 116. In some embodiments, a sensor 120 or a portion of a sensor 120 is executed on the central management server 116 or in a cloud computing environment. Similarly, the network mapping manager 130 or portions thereof can be executed on other nodes in the system 100 or in a cloud computing environment. In addition, various portions of or functions of the network detection sensor 120 or network mapping manager 130 can sometimes be divided in different ways across agents 110, supernodes 111, 115, 117 and servers 116.

The network detection sensor 120 can have a variety of functions which can differ based on the machine on which the module 120 is running and the current status of the machine in the networking environment 100. For example, when the module 120 is running on a supernode 111, 115, 117, the module 120 can perform more managerial functions (e.g., instructing agents 110 regarding what network tests to perform). When the module 120 is running on an agent 110 that is performing network testing, the module 120 can perform subordinate functions (e.g., receiving instructions regarding the network tests to perform). As stated above, in some embodiments, one or more of the supernodes 111, 115, 117 can be agents 110 and perform managerial and subordinate functions. Further, the status of a node can change over time, such that agents 110 can sometimes become supernodes 111, 115, 117 and supernodes 111, 115, 117 can become agents 110. Similarly, since there can be multiple layers of management in the network mapping system 100, there can be different levels of supernodes in the structure, and a supernode can be promoted to a higher-level supernode or demoted to a lower-level supernode. Thus, as each node changes levels in the hierarchy, the functions of the network detection sensor 120 executed by that node can also change.

In brief summary, the network detection sensor 120 detects devices in a network (or in a subnetwork 114, 118 of an overall network 112) based on communication between agents 110. The sensor 120 can receive (e.g., from the central management server 116 or a supernode 111, 115, 117) an assignment in the network hierarchy. For example, the sensor 120 might receive instructions to act as a supernode in some level of the hierarchy or to act as an agent 110. Where the sensor 120 receives an assignment to be a supernode 111, 115, 117, the sensor 120 can instruct two or more agents 110 to perform a set of network traffic fingerprinting tests of the subnetwork 114, 118 mapped by that supernode. The sensor 120 of the supernode receives the results of the tests from the agents 110 and detects any intermediate devices (e.g., stealth devices hiding on the network or previously undetected devices) located between the agents 110 based on the effect of the intermediate devices on information passed between the agents 110. The sensor 120 can further use this data in mapping the topology of the subnetwork 114, 118, which can be combined with results from other supernodes for mapping all of or a larger portion of the network 112.

Where the sensor 120 receives an assignment to be an agent 110, it performs the testing side of the operation instead of the managerial role. In some embodiments, no assignment is given because any node that is not assigned to be a supernode is by default an agent 110. The sensor 120 can receive instructions from a supernode 111, 115, 117 to perform a set of network traffic fingerprinting tests of the subnetwork 114, 118 by sending information back and forth with other agents 110 in the subnetwork 114, 118. It can provide the test results to the supernode 111, 115, 117 which can be used in detecting devices and mapping the network topology. In some cases, the sensor 120 may be performing both managerial and subordinate operations. It may perform supernode functions by providing testing instructions and collecting the results, but it may also be itself performing some network testing based on instructions from a higher-level supernode and providing results to that higher-level supernode.

Figure 3A:
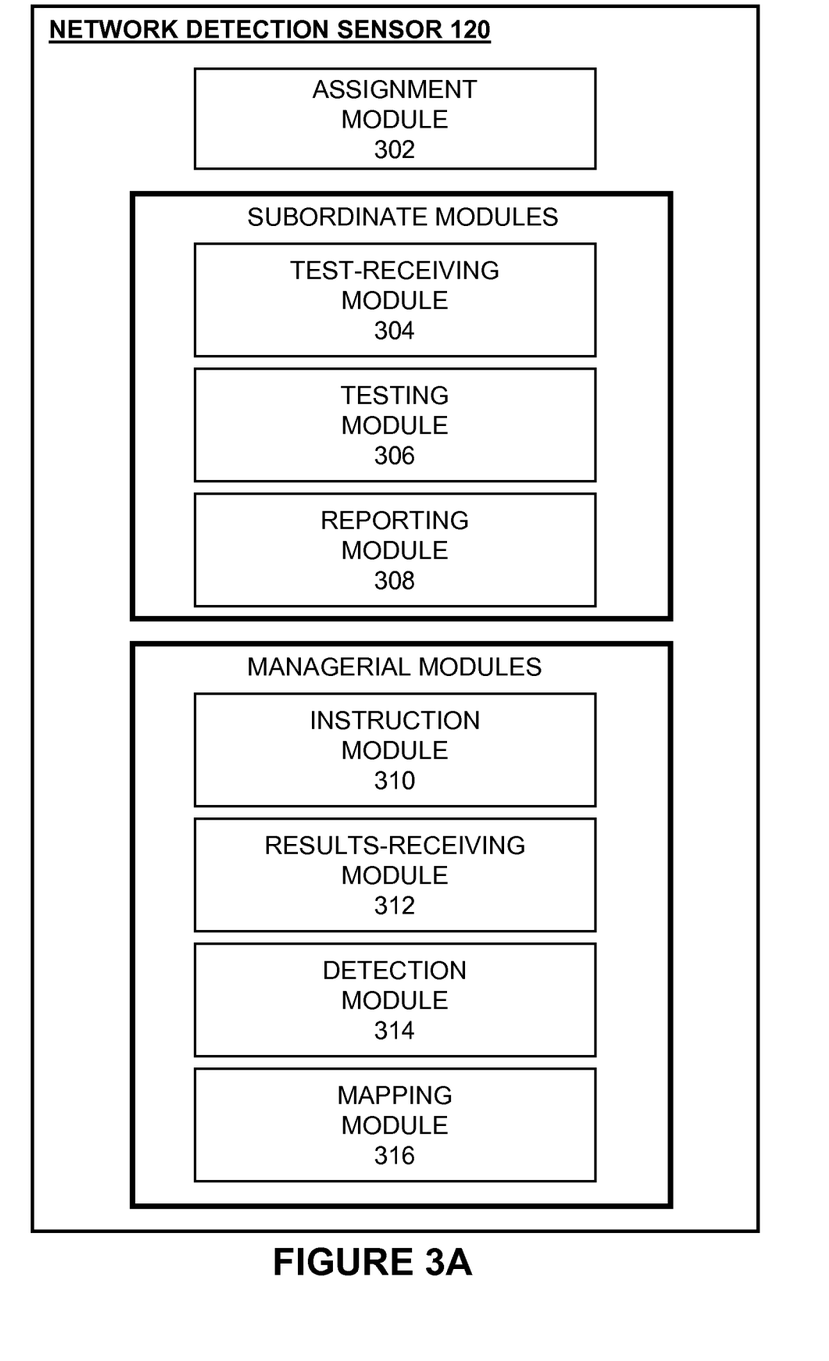
FIG. 3A is a high-level block diagram illustrating the functional modules within the network detection sensor 120, according to one embodiment of the present invention.
Figure 3B:
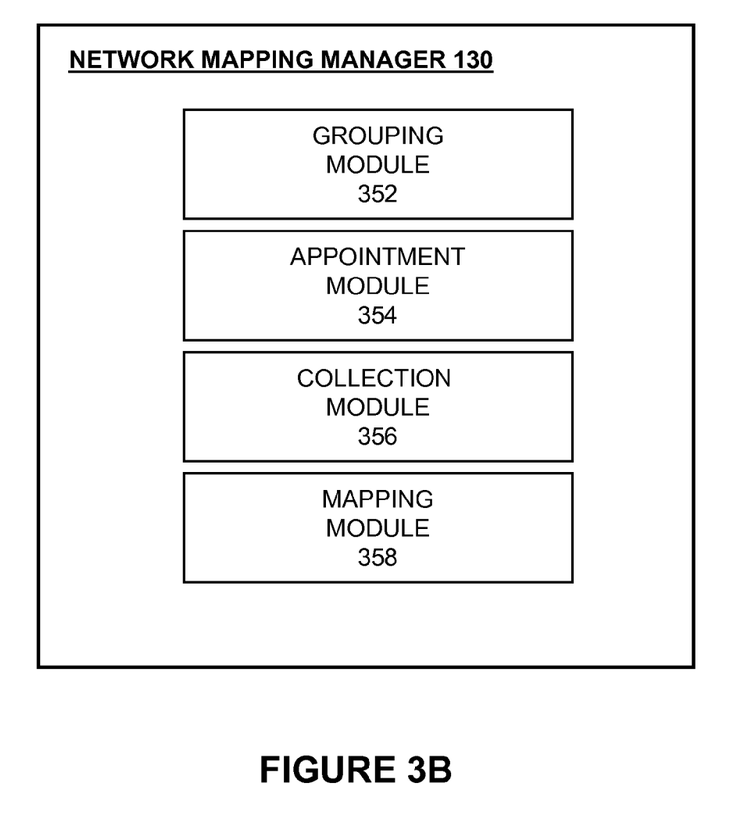
FIG. 3B is a high-level block diagram illustrating the functional modules within the network mapping manager 130, according to one embodiment of the present invention.

In implementing the network detection sensor 120, the system 100 can take advantage of a pre-existing management infrastructure of an enterprise's network, including many "managed clients" of the network that can be utilized by the system 100 as agents. Each of these managed clients used as agents 110 by the system 100 can include at least one ubiquitous endpoint security solution or management program via which the central management server 116 or top-level supernode 117 can easily deploy sensors 120 to the agents 110, can appoint certain agents to be supernodes, can collect reports from agents/supernodes, and can send out updates to the agents/supernodes, and so forth. Further, these agents 110 are trusted systems (e.g., having a security code or other verification method to ensure their reliability) that provide a mechanism to deploy software securely. In this manner, the system 100 provides a managed overlay network that uses the agents from this pre-existing infrastructure to extend the system's functions of performing device detection and mapping the network. The system 100 can communicate with and distribute sensors 120 to remote corners of the network 112 to develop a much more thorough map of the network topology. The network detection sensor 120 is described below in more detail with regard to FIG. 3.

Referring now in brief summary to the network mapping manager 130, this manager 130 provides the overall management of the system 100. The network mapping manager 130 handles the creation of the management architecture of system 100 by dividing the network 112 into various components of the hierarchy or subnetworks 114, 118. The manager 130 further appoints various supernodes to be responsible for mapping the subnetworks, and manages the reconfiguration of the system 100 where needed (e.g., appointing of additional supernodes, demoting of supernodes, merging of subnetworks). In addition, the manager 130 collects testing results and/or mapping data from the various supernodes 111, 115, 117 regarding their subnetworks 114, 118 and uses this to map the overall network 112.

As used herein, the term "intermediate device" or "intermediary device" refers to a device for which detection is desired, that is located between and connected via a network/subnetwork 112, 114, 118 to two or more nodes (e.g., agents 110, supernodes 111, 115, 117), including devices that have not been previously detected/mapped, stealth devices (e.g., rogue machines, rogue access points, and backdoors to the Internet, "bumps on the wire," transparent devices that attempt to hide their presence), and also stealth devices that are malicious (e.g., performing some damage or harm to the network, surreptitiously collecting information for a harmful purpose or in an undesired way). The system 100 can also detect other information regarding devices (e.g., by collecting configuration data on these devices, themselves), including identifying nodes that are using virtualization, dual-homed, network sharing, and performing other on-host techniques that could circumvent network security policies.

Figure 2:
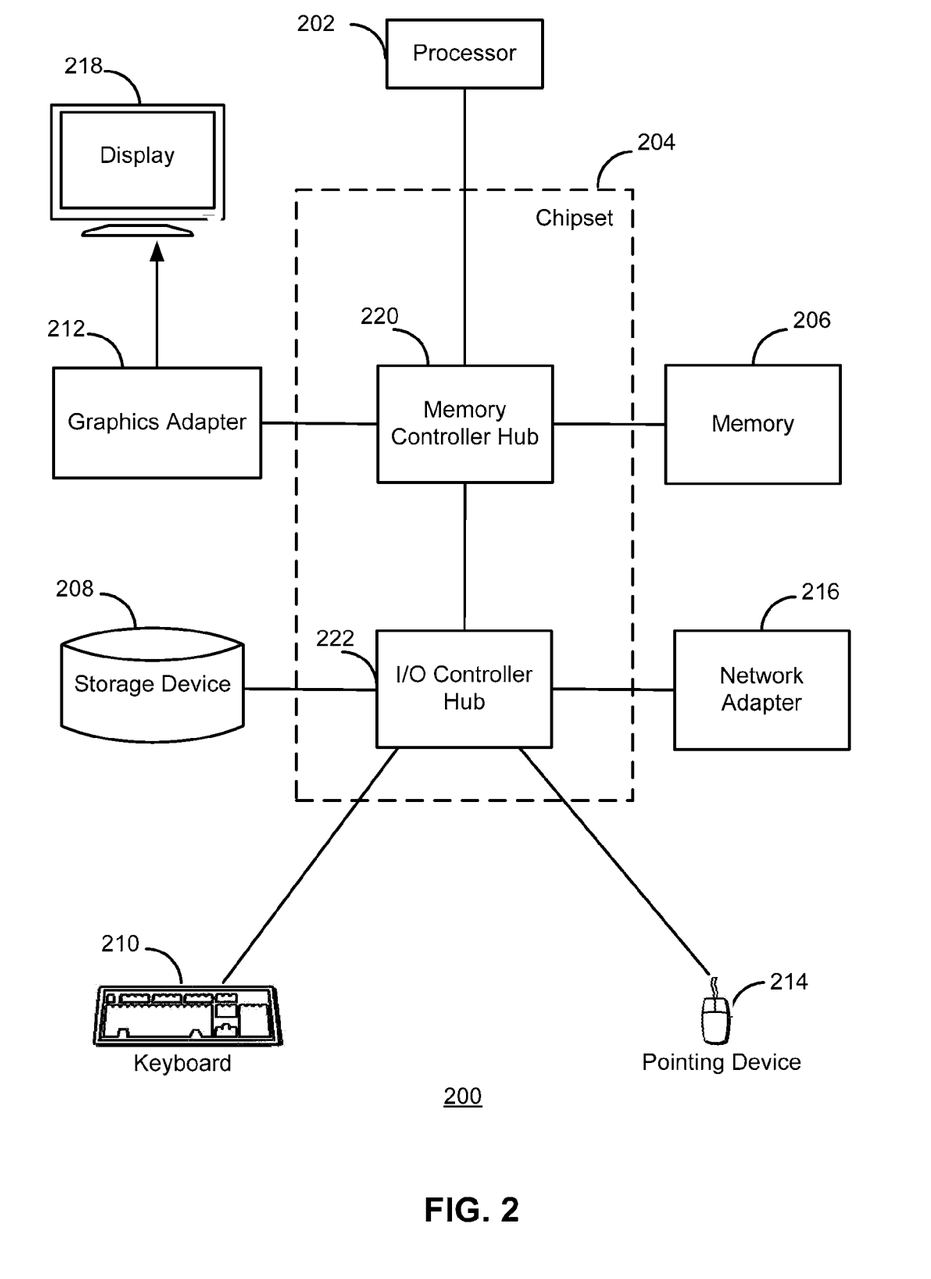
FIG. 2 is a high-level block diagram illustrating a computer system 200 for use with the present invention.

FIG. 2 is a high-level block diagram illustrating an example of a computer 200 for use as a server 116, a supernode 111, 115, 117, and/or an agent 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module," "network detection sensor," or "network mapping manager" refers to computer program instructions and other logic used to provide the specified functionality. Thus, a module/sensor/manager can be implemented in hardware, firmware, and/or software. In one embodiment, program modules/sensors formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, an agent 110 that is a mobile telephone typically has limited processing power, a small display 218, and might lack a pointing device 214. The server 116, in contrast, may comprise multiple blade servers working together to provide the functionality described herein.

II. Network Detection Sensor 120 of Supernodes/Agents

FIG. 3A is a high-level block diagram illustrating the functional modules within the network detection sensor 120, according to one embodiment of the present invention. The network detection sensor 120, in the embodiment illustrated in FIG. 3A, includes an assignment module 302, a test-receiving module 304, a testing module 306, a reporting module 308, an instruction module 310, a results-receiving module 312, a detection module 314, and a mapping module 316. Some embodiments of the network detection sensor 120 have different and/or additional modules than those shown in FIG. 3A and the other figures. Likewise, the functionalities can be distributed among the modules in a manner different than described herein. Certain modules and functions can be incorporated into other modules of the network detection sensor 120 and/or other entities on the network 112, including the server 116.

The assignment module 302 of the sensor 120 receives an assignment from the server 116 (or from a supernode) regarding the role the node will play in the management structure. The module 302 can receive an assignment to be a supernode 111, 115, 117 that will manage multiple agents 110 of a subnetwork 114, 118, and that can be managed by one or more supernodes and the server 116. The module 302 can also receive an assignment to be an agent 110 that will be managed by one or more supernodes 111, 115, 117. In some embodiments, the module 302 can both be a supernode 111, 115, 117 and an agent 110. In other embodiments, computers executing the sensor 120 are assumed by default to be agents, unless instructed otherwise to be supernode. In this case, the only actual assignments received are assignments to be supernodes.

Once the assignment has been received, the sensor 120 can take on the role assigned to it, whether it be subordinate (e.g., agent), managerial (e.g., supernode), or both. FIG. 3A illustrates the subordinate modules (e.g., modules 304 through 308) associated with the subordinate functions of performing network testing, and the managerial modules (e.g., modules 310 through 316) associated with the supernode functions of managing various agents 110. As noted above, however, the roles of any given node on the network 112 can vary, so the sensor 120 on each node is capable of performing either or both managerial and subordinate tasks depending on the role assigned to that sensor 120. Thus, while the subordinate modules are described predominantly in terms of agents' actions and the managerial modules are described predominantly in terms of supernodes' actions, any of these actions can be performed by either agents or supernodes.

A. Subordinate Modules

Turning first to the subordinate modules of the agents 110, the test-receiving module 304 receives instructions from the supernode to perform a set of network traffic fingerprinting tests of the subnetwork 114, 118. For example, the module 304 might receive instructions to pass information across the subnetwork to other agents for detecting whether any intermediate devices are located between the agents 110. The module 304 might be instructed to send out a particular message or packet of data. The module 304 might be further instructed to respond in a particular way to a message or to data received from another agent 110. Similarly, the module 304 might be instructed to perform monitoring of the subnetwork 114, 118, or otherwise individually collect data about the subnetwork 114, 118 in a manner that does not require interaction with other agents 110.

The testing module 306 performs the communication/fingerprinting tests received by the test-receiving module 304 and carries out the particular instructions indicated, including instructions to send and receive information across the subnetwork 118, 114 to/from one or more other agents 110. A variety of different tests can be performed by the testing module 306, including those described below, and different tests can be dynamically generated. Throughout this description, it should be noted that the examples provide a sampling of tests that can be performed with system 100, not an exhaustive catalog. One of ordinary skill in the art will recognize that many other testing options are possible.

1. Client-to-Client Protocol

One embodiment of the testing procedures performed by the agents 110 is a client-to-client protocol for mapping intermediary network devices. In some embodiments, the agents 110 or supernodes (e.g., 111) can have an administrative channel (described regarding FIG. 3B) back to central management server 116, and the system 100 can take advantage of this to coordinate testing of the link between two arbitrary agents 110 in an enterprise. Using a battery of tests, system 100 can determine the presence of one or more intermediate layer 1 devices (e.g., hubs or repeaters), layer 2 devices (e.g., network switches or network bridges), and layer 3 devices (e.g., network switches that process data at network layer or multi layer switches) on the network 112. Based on the specific test results, the system 100 can infer the specific make and model of intermediate devices. When more than one intermediate device is present, system 100 can detect the composite results and will attempt to extract the full sequence of devices.

Before performing extensive network profiling, the testing module 306 can be instructed to perform initial querying/testing. The module 306 can query each device on the network to identify itself using a variety of common administrative port values. Further, when two agents 110 communicate, they can first use traceroute in some cases to determine the number of layer 3 devices between them. Traceroute is a commonly used command that sends out packets of information to a destination network address, and each intermediate computer along the path to the destinations responds, indicating its presence on the path and further providing data regarding the time taken for the packets to travel between each computer in the chain. But there may also be additional devices that offer layer 1 or layer 2 functionality, or that perform transparent in-line security functions without presenting their own Internet Protocol (IP) address or even Media Access Control (MAC) address. The system 100 can identify the presence of local layer 2 devices by the fact that they respond to Address Resolution Protocol (ARP) requests and present themselves. The existence of intermediate devices can further be inferred by the effect they have on passing traffic (e.g., data sent back and forth) between the agents 110. This effect can be measured in latencies and also in specific packet transformations and restrictions that are observed with regard to the passing traffic.

The testing module 306 can use many characteristics of different network stack implementations to determine the hardware and/or operating system of an intermediate device. In some embodiments, it does this in a manner similar to that employed by Nmap, an open source utility for network exploration or security auditing. For example, there are a number of different strategies for choosing Transmission Control Protocol (TCP) sequence numbers—the module 306 can communicate several times with a target intermediate device to narrow down which strategy that target is using. The module 306 can use different combinations of TCP options flags and observe how the target responds to them. The module 306 can send a SYN/ACK packet or a RESET packet to a port that did not initiate a communication to see how it handles those error cases. It can send additional data to a port after the port is closed to see how it responds. A variety of additional tests can be performed by testing module 306. Some examples are provided below.

a. Detecting Switches and Hubs

Although some network mapping tools (e.g., Nmap) can provide information about managed switches, they are unable to detect unmanaged switches, to determine which machines are attached to which switch, or to detect when switches and hubs are being chained or lined up in a sequence on the network. The testing module 306 can apply device latency tests to uncover switches in series. Every hub and switch can have latency characteristics. Using various probes, the module 306 can detect the presence of intermediate switches and hubs within a subnetwork 114, 118. By initiating probes from many different agents 110, the agents 110 can be grouped into classes. In embodiments involving a marginally-invasive protocol, an agent 110 can broadcast a request for other agents 110 on the subnetwork 114, 118 to go silent in order to conduct the most accurate latency tests possible. Alternately, the other agents 110 can be told to flood the switch with traffic in order to determine how it handles such cases.

In addition to latency tests, the testing module 306 can use tests to tell if two devices are on the same switch by generating a false return MAC address from one agent 110 and then attempting to address packets to that MAC address from another agent 110. If they are on the same switch, the traffic can be sent to the proper port. If they are not, the switch will not have seen the false address and will broadcast the connection attempt. If necessary, a third agent 110 can be involved to watch for these broadcasts.

In order to get specific information about the model of switch being used, the testing module 306 can generate a sequence of false MAC addresses in order to overflow the address table in the switch (e.g., using the "macof" command in some LINUX distributions). This overflow condition can be observed by sending a correctly addressed packet and determining whether it is broadcast or simply delivered. Cheaper switches generally have much smaller address tables and can be easily overflowed. By varying these tests, the size of the address table can be estimated. All of these characteristics can be combined to provide an estimate of the hardware present on the subnetwork 114, 118. These techniques can also be employed to attempt to identify logically distinct switches that may in fact be a virtual local area network (LAN) residing on the same physical hardware. Further, managed switches and network access devices also generally implement the 802.1x protocol for network admission control. There are numerous implementations of this protocol and tests can be developed to differentiate between manufacturer implementations based on how they respond to error conditions, flooding, etc.

b. Basic Network Behavior

The testing module 306 can run a variety of tests to determine the basic network behavioral characteristics of the link between agents 110. These low-level tests can be performed in isolation and also in combination with other higher-level protocols to determine characteristics of specific devices that might be filtering specific protocols. As one example, the testing module 306 can generate a series of packet fragments, some of which can be delivered in order, and others of which can be delivered out of order. If packet fragments are delayed until the entire packet is transmitted, it can indicate that some intermediary device is performing packet reassembly. The module 306 can also transmit series of overlapping packet fragments, such that certain parts of the packet are defined ambiguously in more than one fragment, again sending the fragments in different orders. The results can be observed to see what packet fragment disambiguation strategy is being used and provide insight into any intermediate device performing packet reassembly.

As another example, the testing module 306 can transmit a series of packets using different maximum transmission unit (MTU) values. If fragmentation occurs, this can indicate the presence of an intermediate link with a lower value. This can be used to detect the presence of certain wireless links and also specific VPN technology.

As a further example, the testing module 306 can test for the precise location (in hops) of an Intrusion Prevention System (IPS) device by taking advantage of a known vulnerability in the IP implementation for the hop limit/hop count field of the header. The agents 110 can synchronize the test, such that the receiving agent 110 understands the hop count from the sending agent 110. It can then decrement the hop count by one and proceed to send a series of packets. By varying the hop counts and sending some packets multiple times with different hop counts, an intermediate IPS can be tricked into revealing itself when it blocks packets that it believes are duplicates. By varying the hop count, it is possible to pinpoint the location of the IPS in the sequence of layer 3 devices.

STUN (Simple Traversal of UDP through NAT (network address translation)) and TURN (Traversal Using Relay NAT) are used by peer-to-peer protocols to map devices and their addresses to those present on the egress side of their access points. In another testing example, the testing module 306 can use this information to provide the specific addresses used in the address pool for devices utilizing Network Address Translation. This gives a better indication of the addresses used throughout the network and any private subnetworks being created by the NAT device. The testing modules 306 of two agents 110 can be instructed to have one agent 110 present itself as a STUN server and the other agent 110 initiate a STUN connection to it. The STUN protocol can determine a great deal of information about the specific type of any NAT device behind which the agent 110 resides. The protocol can then be repeated with the second agent 110 emulating a STUN server.

c. IPv6 Fingerprinting

The testing module 306 can also be designed to detect the presence of Internet Protocol Version 6 (IPv6) and can use some of the transitioning technologies to determine the presence of devices that may provide IPv6 to IPv4 between two agents 110. In some cases, a dual-stack implementation of IPv4/IPv6 may be required. For each IPv6 fingerprinting test described below, the agents 110 can synchronize the test such that an indication is returned on the reception or failure to receive the attack.

As a first example of an IPv6 test, one agent 110 can issue IPv6 renumbering and duplicate address attacks to another agent 110 when both have an IPv6 address assignment. The presence of a security device between the agents 110 will prevent the attack from occurring, and such a prevention can help to reveal this type of intermediate security device. As a second example, one agent 110 can issue an IPv6 Neighbor UnReachable attack to another agent 110 when both have an IPv6 address assignment. The presence of a security device between the agents 110 will prevent the attack from occurring, thus again revealing such an intermediate security device. As a third example, when one agent 110 has an IPv6 address assignment, it can issue an IPv6 to IPv4 Translation test to another agent 110 that does not have an IPv6 address. The presence of a gateway/router device between the agents 110 allows the transmission of traffic to occur. This test uses the Stateless IP/ICMP (Internet Message Control Protocol) Translation (SIIT) protocol to traverse the network access point. As a fourth example, when only one agent 110 has an IPv6 address assignment, it can attempt to issue an IPv6 to IPv4 Translation test to another agent 110 using Network Address Translation—Protocol Translation (NAT-PT) to traverse any intermediate network access point. A variety of other IPv6 tests are also possible.

d. Higher-Level Protocols

The testing module 306 can also take advantage of higher-level protocols, such as Domain Name Service (DNS), SMTP, and HTTP to discover the presence of network security devices, such as firewalls, IPSs, and Intrusion Detection Systems (IDSs). Specifically, the module 306 can be used to take advantage of well-known limitations and vulnerabilities within these protocols to detect the presence of intermediate filtering, even when those filtering devices attempt to be transparent. Observing how the IPS treats each of these specific cases can provide a great deal of insight into the exact type of device present.

There are various different tests that the testing module 306 can use to identify DNS and security devices that may be in line to protect this service. As a first example, implementations of Berkeley Internet Name Domain (BIND) below version 9 did not randomize the transaction ID and are vulnerable to a replay attack. Most security systems are sensitive to this vulnerability and will automatically randomize the ID. The testing module 306 can exploit this feature of security systems by generating DNS traffic that uses sequential transaction IDs and observing whether they are rewritten or blocked (indicating an intermediate security device). Some security devices disallow DNS requests to arbitrary systems and may redirect the request, report an error, or simply drop the request. Each of these actions indicates the presence of a specific type of security device. As a second example, a known "Birthday Paradox" vulnerability can be used to determine the presence of a firewall, IPS, or IDS. For this test, multiple, simultaneous recursive queries for the same IP address can be sent by the testing module 306 to the DNS service. A firewall or an IDS/IPS will prevent recursive lookups and result in the request being dropped or modified, thus indicating that such a firewall or an IDS/IPS is present. As a third example, since Nov. 1, 2007, the address for the L Root server has changed from 198.32.64.12 to 199.7.83.42. Many firewalls will prevent or redirect this request to the correct L Root server, again revealing their presence on a network. As a fourth example, a restriction on truncated DNS UDP packets can be used by the testing module 306 to determine the presence of a firewall. In general, firewall implementations prevent the response of a UDP DNS request on port 53 to be truncated. If an intermediate security device is present, it will either redirect the request using TCP, or fail and return an error to the agent 110 requesting the lookup.

The SMTP mail delivery service is ubiquitous and has a history of significant vulnerabilities. A variety of different SMTP fingerprinting tests can be performed by the testing module 306 to exploit these vulnerabilities. As a first example, embedded content within an SMTP response can be used by the testing module 306 to detect the presence of a firewall with anti-virus capability. A first agent 110 can send an SMTP request with embedded content and a known (opaque) vulnerability. Modification of the content in the request, or the return of an error message to the sender, indicates the presence of an anti-virus capable intermediate device. This test can be performed bidirectionally to detect both ingress and egress filtering. As a second example, some firewalls and IPS devices limit the size and content type, which is reported in the SMTP header "CONTENT-TYPE" and "CONTENT-DISPOSITION." Many implementations limit this size, with some limiting to 200 and others to 1024, whereas the actual allowable size defined within RFC 2822 is 8192. The testing module 306 can issue a number of requests of various types using the known default sizes for different brands of firewalls and can observe which ones are truncated or blocked, indicating the presence of an intermediate device. As a third example, every firewall and IPS/IDS device prevents the use of known vulnerabilities within the SMTP "command" request, particularly with any use of the "DEBUG" or "Wiz" commands. Particular implementations can differ, however. Some firewalls parse the header and only block requests that have these strings in the COMMAND field. Others simply scan the entire header and block anything containing those strings. This can be used to detect intermediate devices and to identify the particular implementation used.

Like SMTP, HTTP is both ubiquitous and has numerous vulnerabilities. It is also used to tunnel other services. Observing how thoroughly a device filters HTTP misuse provides insight into the specific device. As a first example, the testing module 206 can embed specific vulnerabilities into HTTP traffic and observe which ones are blocked. These can range from trivial header buffer overflows to complex JavaScript race conditions, and can be used to identify the sophistication of the filtering device. Varying the age of vulnerabilities can also help to identify the age and version of the filtering device. As a second example, the testing module 306 can send instant messenger, Simple Object Access Protocol (SOAP), and Secure Shell (SSH) traffic through ports 80 and 443. A simple filtering firewall will allow these. A more complex proxying firewall will block one or more of them. This test can be used to distinguish between these two firewall types. As a third example, HTTP provides the ability to perform anti-virus scanning in such a way that the response to the server is "trickled" to prevent session timeouts. One agent 110 can request a large document from another agent 110, which requires trickling. Based on the inability to trickle (e.g., a timeout occurs) or the trickle method used, the intermediate security device can be detected and characterized. These are just some examples, and a variety of other higher-level protocol tests are also possible.

2. Client Data Collection

In addition to the client-to-client protocol, there is a great deal of relevant network information that can be collected on and by each agent 110 individually. Each agent 110 can have the following capabilities in addition to the client-to-client protocol described above:

1. Passive monitoring of traffic (primarily broadcast) on local network interfaces
2. Preliminary data collection
3. Collecting of host-based network information
4. Monitoring of wireless network interfaces on the system Each of these capabilities is described below.

a. Passive Monitoring of Broadcast Traffic

The testing modules 306 of agents can monitor broadcast traffic. Modern networks are extremely chatty. Although switched environments have reduced the ability to listen promiscuously to other agents' traffic, there is still a significant amount of broadcast traffic providing information about local network entities and services. At the lowest levels, devices use ARP broadcasts to map IP addresses to MAC addresses. Also, file and printer sharing services use Name Message Block (NMB) broadcasts to map machine names to physical addresses. This trend is increasing—modern printers and other devices use Zero Configuration Networking (zeroconf), such as Bonjour, to facilitate plug and play discovery. Even when devices are not actively broadcasting, they are often configured to respond to broadcast requests for information, allowing any host on the same network segment to locate them. The testing module 306 of an agent 110 can maintain a list of all local MAC and IP addresses that it has observed broadcasting on its local segment. When requested, the agent 110 can maintain a list of all Bonjour, NMB, and other broadcast service advertisements or requests that it observes. The agent 110 can also maintain a lightweight list of three-way handshake information for recent TCP connections involving the host.

b. Preliminary Data Collection

The testing modules 306 of the agents 110 can perform certain preliminary testing in a manner similar to that done by Nmap. For example, ARP requests can be used to derive a list of active devices on the local network. Each device can then be enumerated to ascertain the network protocols capable within that targeted device. The module 306 can determine the use of IPv4 or IPv6 and, using reverse DNS resolution, can determine the names of the devices found. For each device, it can use targeted probes to derive a set of features that are available for the system. This information can be used for device classification because it provides data needed for identifying systems that have a rich set of features enabled and that can act as more than just a network endpoint. For those devices that have extended features, such as HTTP, SMTP, or other services, the module 306 can ascertain the protocol versions and implementations in use. In addition, the module 306 can determine the specific operating system that a device is running The testing module 306 can use a traceroute facility (e.g., such as that within Nmap) to determine which devices act as access points to extended networks. For this operation, two traces can be obtained, one to an Internet-identified agent 110 and the second to the assigned supernode. This information can be used for both the mapping of the network and the identification of routers, gateways, firewalls and other security devices that may reside in the egress and ingress paths. Many devices may be readily identifiable. For example, most routers and managed switches have an administrative port that will provide the model and version of the device using protocols such as HTTP, Universal Plug and Play (UP&P), or Simple Network Management Protocol (SNMP). Databases of these characteristics of routers and managed switches provided by other mapping tools (e.g., Nmap) can be also used in this mapping. Before performing extensive network profiling, the module 306 can ask each device to identify itself using a variety of common administrative port values. A tentative network model can be constructed from these replies and then verified using the client-to-client protocol and other communication testing. The module 306 can also attempt to profile both local systems and other enterprise systems with which the agents 110 interact. In a managed enterprise, agents 110 often do not interact directly with external systems for services—communications are with internal proxy or application servers (web, mail, internal applications, file, authentication and directory, network-attached storage) and other agents 110. Each supernode 111, 115, 117 can compile a list of the servers with which its agents 110 communicate, as well as the protocols used. It can then collect information about those servers (e.g., using basic facilities provided by other networking tools, such as Nmap) and can incorporate them into the network model. If more details are required, the system 100 can assign a single supernode with the responsibility of performing additional testing and mapping it in detail.

c. Collecting of Host-Based Network Information

The testing modules 306 of agents 110 can also be used for collecting host-based network information. Modern agents 110 are becoming increasingly complex. The vast majority of laptops now contain more than one network interface and some contain as many as four. Virtualization is becoming increasingly common as a way of providing backwards- or cross-compatibility. Many APPLE® systems use virtualization to run MICROSOFT® operating systems, and WINDOWS 7® includes virtualization for running WINDOWS XP® programs. Many agents 110 now contain wireless hardware that, even when not in use, represents a risk of data exfiltration or network bridging. Finally, agents 110 can host software that provides overlay networks, tunneling, cloud services, and other services meant to bypass corporate firewalls or corporate security policy. All of these client-based networking concerns manifest themselves as normal network traffic. While they could be discovered through deep packet inspection or traffic profiling, it is more straightforward to collect this information on each agent 110. An agent 110 can report a list of every local network interface (including virtual network devices) that it observes, providing the IP, MAC, netmask, and local routing rules. The agent 110 can further use a variety of techniques to reliably determine whether the managed system itself appears to be running on a virtual machine.

d. Monitoring of Wireless Interfaces

The testing modules 306 of agents can also be used for monitoring of wireless interfaces. When wireless hardware is available and in use, an agent 110 can maintain a list of each of the broadcasting wireless networks that it observes or joins, including SSID, signal strength, and encryption. When wireless hardware is available but not in use, the agent 110 can be capable of performing sniffing of local wireless traffic in order to observe networks that are being used but not broadcasting their service set identifications (SSIDs). Any attempts to connect to hidden networks can be reported with the MAC address of both the origin and destination devices.

In some embodiments, the testing module 306 uses Aircrack-ng program functionality to crack weak Wired Equivalent Privacy (WEP) keys and determine whether any traffic traversing over those networks either originates from, or is destined to, a managed enterprise host.

Returning again to the subordinate modules of FIG. 3A, the reporting module 308 provides the results of the tests performed by testing module 306 to the supernode 111, 115, 117 for detection of intermediate devices located between the agents 110 (e.g., based on an effect of the intermediate device on the information passed between the identified agents). In cases where the agent 110 that performed the testing is a supernode within a larger subnetwork managed by a higher-level supernode, the reporting module 308 of the supernode can provide the results of the tests to the higher-level supernode.

2. Managerial Modules

Turning next to the managerial modules of the supernodes 111, 115, the instruction module 310 can identify two or more of the agents 110 to perform a set of network traffic fingerprinting tests of the subnetwork 114, 118, and can then instruct those identified agents 110 to perform the tests. The module 310 can instruct the agents 110 to perform any of the tests described above, including various client-to-client communication tests involving passing information back and forth among the agents 110. The testing instructions can be received by test-receiving module 304 and performed by testing module 306 of the agents 110. The supernode 111, 115, 117 will have a reliable communication channel with one or more agents 110, and so the supernode 111, 115, 117 can instruct the various agents 110 about which tests to perform and when to perform them. It can then collect data from the various agents 110 and correlate the results. In some embodiments, the supernode 111, 115, 117 can exploit the results of early tests to focus further tests using a decision-tree model.

In some embodiments, the supernode 111, 115, 117 uses a two-phase commit model to coordinate agents 110. It can deliver the instructions to two agents 110, and then notify the two agents 110 when both agents 110 have acknowledged the instructions. The agents 110 can both begin monitoring the network at the first message from the supernode 111, 115, 117, but may only begin transmitting data at the second message from the supernode 111, 115, 117. Both agents 110 can use some reasonable timeout to abort if messages are lost. As part of the test suite, the agents 110 can attempt to find at least one open port between them. If any such port exists, they can use it to deliver synchronization messages. Otherwise, they can report to the supernode 111, 115, 117 to determine whether any further testing is needed.

The results-receiving module 312 receives results of the tests from the agents 110. In some embodiments, the results received are the raw results of the testing performed (e.g., the data returned or the observations made as a result of performing the tests). In other embodiments, the agents 110 have performed some additional analysis or interpretation of the results, including determining particular information about an intermediate device (e.g., the type of device, where it is located, what it is connected to). In this case, the results received may include additional information about detected devices.

In embodiments in which the supernode is a higher-level supernode 115, 117, the results-receiving module 312 can receive, from lower-level supernodes (e.g., supernodes 111), testing results for each of the subnetworks 118 managed by those lower-level supernodes. For example, supernode 111 managing a number of agents 110 can collect testing results from those agents 110 and provide those to supernode 115, and supernode 115 can similarly receive testing results from various supernodes 111 that can be used for device detection/topology mapping. The results received can include identifying data about the various devices detected on the subnetwork, including the type of device, its operation parameters, where it is located and how it is connected to other devices, etc. In some embodiments, each supernode 111 is responsible for mapping its subnetwork 118, and the results provided to the higher-level supernode 115 are the mapping results from the topology mapping of the subnetwork 118 (described below).

The detection module 314 detects one or more intermediate devices located between the agents 110 based on an effect of the intermediate devices on the information passed between the agents 110 or based on other characterizing information about the intermediate devices. For example, the module 314 can interpret the results of the various tests described above that were performed by the testing modules 306. The module 314 can determine information, such as whether an intermediate device is present, what type of device it is including the specific make and model or version, how it is implemented, where it is located, the physical ordering of intermediate devices relative to other such devices or relative to the agents 110, to what other devices it is connected, operation parameters of the intermediate device, whether an intermediate device is failing to respond to requests to identify itself, whether it is a stealth device (e.g., hiding from detection, a rogue device or wireless access point), whether it is malicious, whether it is collecting data regarding the network, and other characterizing data.

These various data points collected about the intermediate device by a number of agents 110 can be combined by the detection module 314 to form a fingerprint or signature for the intermediate device. In some embodiments, the detection module 314 compares the fingerprint to a fingerprint database 109 for network devices to determine what type of network device it is or to otherwise classify the device. In these embodiments, the comparison can be done by providing the fingerprint information up to various higher-level supernodes, where it can be combined with other fingerprint data, until the complete collection of fingerprint data is received by the top-level supernode 117 which performs the comparison to the fingerprint database or provides the data to the server 116 for this comparison. In other embodiments, other supernodes may also have access to the database 109 or a portion of it to perform the comparison or a part of the comparison. A fingerprint set can be used to validate the request or response of a network device, including validating that a network device is really what it says it is in response to a request to identify itself.

As new devices are detected that had not previously been detected, the system 100 (e.g., the server 116 or certain supernodes) can dynamically generate new fingerprint tests for detection of this new type of device. These tests can then be provided to some or all of the supernodes on the network 112. These supernodes receive these dynamically-generated tests and can then instruct their agents 110 to perform these tests when needed, and can apply these to detect other instances of the new type of device. These fingerprints may further be automatically updated to support additional tests or identify additional devices. Fingerprint definitions may be provided by a number of sources (e.g., research labs and security response teams). A combination or series of fingerprints can be grouped to define a single device fingerprint. Full sets or subsets of these fingerprints can be deployed to the detection module 314, depending on the detection requirement of the subnetwork.

The mapping module 316 can map the topology of the network 112, 114, 118 including the one or more intermediate devices detected. This mapping can also include modifying a model of the topology of the network 112, 114, 118 to include the devices. The module 316 can also report, via reporting module 308, the mapping results up the chain of management to the higher-level supernodes, and possibly ultimately to the top-level supernode 117 and/or central management server 116. In some embodiments, each supernode 111, 115, 117 maps its respective network/subnetwork. For example, a lower-level supernode 111 can map its subnetwork 118, and can provide the local mapping data to supernode 115, which incorporates the mapping results along with results from other lower-level supernodes 111 to map its own subnetwork 114. This can continue up the chain until the entire network 112 has been mapped (or its existing map has been modified accordingly). In other embodiments, each lower supernode is not responsible for mapping its own local subnetwork, but instead provides the results up the chain to a higher-level supernode or to the top-level supernode 117 or server 116 for performing the mapping/modifying of the network topology. The module 316 can store the map or data associated with the map or its modification (or can provide this information to higher supernodes or to the server for storage) in a database (e.g., database 109).

III. Network Mapping Manager 130 of Central Management Server/Supernode

FIG. 3B is a high-level block diagram illustrating the functional modules within the network mapping manager 130 that can be present on the central management server 116 and/or on the top-level supernode 117, according to one embodiment of the present invention. The module 130, in the embodiment illustrated in FIG. 3B, includes a grouping module 352, an appointment module 354, a collection module 356, and a mapping module 358.

The grouping module 352 groups the network 112 into multiple subnetworks 114, 118. With the management architecture described above, the mapping and detection of devices can be divided amongst subcomponents of the network 112. If every agent 110 were to collect all the possible data available to it, the networking environment/system 100 would be overwhelmed. The management hierarchy prevents this by decomposing the detection of device and network mapping into subproblems that are managed within each subnetwork by the agents 110 and supernode 111 of that subnetwork, and the results then can be aggregated and reported to higher level supernodes in the hierarchy. In this manner, the management burden can be distributed to some of the agents 110 that can be designated as supernodes, so that when a remote section of the network is to be mapped, the coordination of that effort can occur on a system local to the remote network, which can deliver the final results to a centralized management server 116 or top-level supernode 117.

In setting up the management hierarchy, the grouping module 352 initially collects rudimentary network data from each agent 110 (e.g., IP address, subnet, and local gateway for each interface). The module 352 can use this information and any other data collected (e.g., Time To Live (TTL) on packets received from the agent 110) to group nodes into candidate equivalence classes (e.g., subnetworks). Further, in enterprise networks in which there are no agents 110 on certain portions of the network, such as a data center, an agent 110 can be added to the data center or a monitoring device can be developed that can also listen on a spanning port in the data center.

The appointment module 354 assigns supernode status to various nodes in the network 112. The module 354 can select nodes from each such group created by the grouping module 352 to act as local supernodes. In some embodiments, the supernodes are selected using a modified clustering algorithm. During analysis, the management server 116 may discover that a new supernode is required and can promote an agent 110 to a supernode 111, 115. In some embodiments, each supernode 111, 115 is responsible for discovering and mapping the cluster of systems assigned to it under its subnetwork 114, 118. If one cluster is found to contain systems that are actually separated by network infrastructure equipment, the grouping module 352 can further decompose these into two clusters and the appointment module 354 can select a second supernode to manage the new cluster. In some embodiments, each supernode is also responsible for measuring the links to other supernodes. If two such supernodes are found to be equivalent, then the grouping module 352 can merge their clusters of systems or their subnetworks. In some embodiments, the module 354 incorporates a simple delegation model using chained digital signatures to ensure that agents 110 cooperate with the appropriate supernodes but cannot be fooled by any other agent 110 claiming to be a supernode.

Applying this approach recursively results in a tree-like decomposition of the network into a reporting hierarchy, and this decomposes a complex mapping problem into a number of much smaller problems that can be distributed across a number of systems. It ensures that each local network is mapped locally, and it prevents links between subnetworks from being saturated by hundreds of pairs of systems trying to test the same link.

The collection module 356 collects testing results and mapping data from the various supernodes 111, 115. As stated above, every supernode can be responsible for commanding and collecting the data from each of its agents 110, thus decomposing the problem of mapping its section of the network, delegating responsibility to other nodes, and collecting and aggregating the results. The supernodes 111, 115 can then provide the results of their testing/mapping up to the collection module 356. In some embodiments, any or all of the nodes on the network 112 can include at least one ubiquitous endpoint security solution or management program (e.g., SYMANTEC® ENDPOINT PROTECTION (SEP), ALTIRIS® AGENT or CLIENT MANAGEMENT SUITE from SYMANTEC®). Via this mechanism, the central management server 116 or top-level supernode 117 can provide assignments to agents/supernodes, can collect reports from agents/supernodes, and can send out updates to the agents/supernodes. This type of infrastructure allows network detection sensors 120 to be easily distributed to most or all corners of a network 112 regardless of underlying network topology, and provides control channels between agents 110 (through the management server as intermediary if necessary). In some embodiments, since the server 116 gets certain data from an existing client management server associated with an enterprise, the server 116 might be on the same system as this client management server, though this is optional. However, in other embodiments, the sensors 120 do not depend on the existence of such a ubiquitous management system, but can be installed on lab systems and configured using conventional software deployment and configuration methods.

The mapping module 358 maps the overall network 112. This module 358 can take all of the testing and/or mapping data collected by the various lower-level supernodes 111, 115 and can combine this data to create a new network topology map or to modify an existing network topology map. In some embodiments, the entire network topology will be periodically regenerated in entirety. Other embodiments include an incremental model that periodically checks that the current topology is accurate and notifies the server 116 or administrator of only those elements that have changed. The module 358 can store the map or data associated with the map or its modification in a database (e.g., database 109). Network maps are commonly presented visually, and in some embodiments, the system 100 can produce network maps in an XML format that can easily be integrated into other visualization tools. In other embodiments, a common tool for network diagrams, such as an exporter for MICROSOFT® VISIO, can be used.

IV. Methods of Operation

Figure 4:
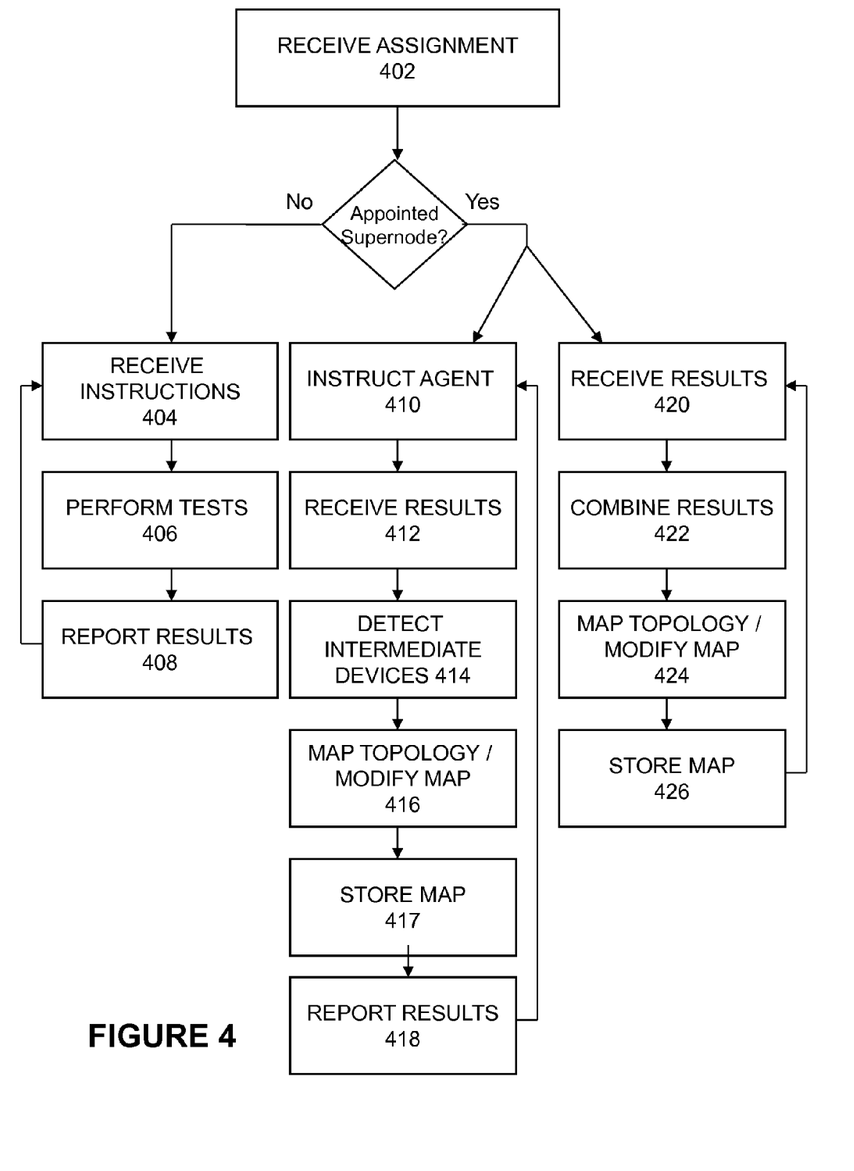
FIG. 4 is a flowchart illustrating steps performed in the subordinate/testing functions and managerial functions of the network detection sensor 120, according to one embodiment of the present invention.

Referring now to FIG. 4, there is shown a flowchart illustrating the operation of the network detection sensor 120, according to some embodiments of the present invention. It should be understood that these steps are illustrative only. Different embodiments of the network detection sensor 120 may perform the illustrated steps in different orders, omit certain steps, and/or perform additional steps not shown in FIG. 4.

As shown in FIG. 4, the network detection sensor 120 receives 402 an assignment in the hierarchy (e.g., receives an assignment to be a supernode or an agent 110). In some embodiments, where no assignment is received, the sensor is by default an agent 110. Where the machine is to be an agent 110, the network detection sensor 120 receives 404 instructions from a supernode 111, 115, 117 to perform a set of network fingerprinting tests (e.g., to send certain information back and forth between agents, to collect certain data based on this information). The sensor 120 performs 406 the network fingerprinting tests instructed and provides 408 the results of the tests to the supernode 111, 115, 117. The tests performed can be any of those described above, including client-to-client protocol tests and individual agent tests, or other similar types of tests. The sensor 120 can repeat the steps each time new instructions are received 404.

Where the machine is appointed a supernode 111, 115, 117, the sensor 120 instructs 410 two or more of the agents 110 identified to perform a set of network traffic fingerprinting tests of the subnetwork 114, 118, including any of the tests describe above, or other similar types of tests. In some cases, the tests may be one or more dynamically-generated tests received from the server 116 or higher-level supernode for detecting new or previously undetected devices. The sensor 120 receives 412 results of the tests from the agents 110, and detects 414 one or more intermediate devices located between the identified agents 110 (e.g., based on an effect of the intermediate devices on the information passed between the agents 110). In some embodiments, it does this detection by combining the data received from the testing into a fingerprint for an intermediate device that it can compare to a fingerprint database 109 or that it can provide to a higher level supernode or server 116 for comparison to a fingerprint database 109. The sensor 120 can also map 416 the topology of its local subnetwork 114, 118 or modify an existing network topology, and can store 417 the map generated. The sensor 120 can further report the results 418 (e.g., detection results or fingerprint data, local subnetwork mapping results) to a higher-level supernode, such as supernode 115, 117, or to the central management server 116. The sensor 120 can repeat the steps each time it is necessary to instruct 410 an agent 110 regarding tests to be performed.

In some cases, the supernode can be a mid- or higher-level supernode (including top-level supernode 117), and so it performs some additional steps. Instead of just reporting results to a higher supernode, it can also receive 420 results reported 418 by lower supernodes. The supernode can then combine 422 the results received 420 from one or more lower-level supernodes. In some embodiments, the supernode can also combine 422 the results received 420 from lower-level supernodes with results from its own detection 416 and/or mapping 418 steps. The supernode can further map 424 the topology of its network 112, 114, 118 or can modify an existing map to reflect the new devices detected, and it can store 426 the map created. The steps can be repeated as new results are received 420. In some cases, the supernode only performs managerial steps, such as 410 to 426 and does not perform any of the steps associated with the agents, including steps 404 to 408. In some cases, the supernode only performs managerial steps 420, 422, 424, 426 and does not perform steps 410 to 418, in which case the supernode only receives 420 results from other supernodes, but does not instruct 410 any agents 110 regarding performing tests.

In this manner, a thorough map of the overall network 112 can be generated by potentially enlisting every agent 110 on the network as a sensor and mapping agent, providing detailed visibility into all corners of the network, even those whose existence was not previously known by network management software. Rather than having a single- or limited-sensor view of the network (like many traditional network scanning tools), the system 100 takes advantage of having multiple agents 110 in providing and maintaining a more detailed and up-to-date map that tracks network configuration changes dynamically, in real time, from multiple viewpoints. The system 100 also avoids problems associated with lack of authorization or administrative privileges to communicate with all forms of network hardware, since it uses agents 110 and it only needs to profile examples of such devices in order to be able to identify them. The system 100 further takes advantage of the enormous processing power distributed across client workstations to divide and distribute the network mapping problem, and offers the scalability benefits of a peer-to-peer system, but takes advantage of the trustworthiness of agents to avoid much of the complexity from which traditional peer-to-peer systems suffer.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

The invention claimed is:

1. A computer-implemented method for mapping a topology of a subnetwork, the method comprising:
   receiving, at a computer, an assignment to be a supernode managing multiple agents of the subnetwork;
   instructing a first agent of the multiple agents to send traffic, via the subnetwork, to a second agent of the multiple agents, the sent traffic having characteristics;
   receiving, at the supernode, a copy of traffic received by the second agent, the received traffic having at least one different characteristic from the sent traffic;
   inferring one or more intermediate devices transmitting traffic between the first and second agents based on the at least one different characteristic between the sent traffic and the received traffic; and
   mapping the topology of the subnetwork including the one or more intermediate devices.

2. The method of claim 1, wherein the supernode is a lower-level supernode managing the multiple agents of the subnetwork below a plurality of layers of higher-level supernodes managing additional agents of larger portions of an overall network including the subnetwork, and wherein the method further comprises the lower-level supernode:
   storing a map generated of the topology of the subnetwork in the mapping step; and
   reporting results of the mapping to one of the higher-level supernodes managing the additional agents of a portion of the overall network including the mapped subnetwork.

3. The method of claim 1, wherein the supernode is a higher-level supernode managing the multiple agents of the subnetwork above a plurality of layers of lower-level supernodes managing additional agents of smaller portions of further subnetworks of the subnetwork, and wherein the method further comprises the higher-level supernode:
   receiving, from the lower-level supernodes, mapping results for each of the further subnetworks of those lower-level supernodes; and
   combining the mapping results received from the lower-level supernodes to produce a map of a topology of the subnetwork of the higher-level supernode.

4. The method of claim 1, wherein inferring one or more intermediate devices further comprises:
   for each of the inferred one or more intermediate devices:
      instructing the first and second agents to perform network traffic fingerprinting tests targeting that intermediate device, and
      combining results of the tests received from the first and second agents to form a fingerprint corresponding to that intermediate device; and
   for each of the formed fingerprints, comparing that fingerprint to a database of fingerprints for network devices to determine a network device type for the intermediate device.

5. The method of claim 1, further comprising:
   instructing the second agent to send a specified response to the first agent in response to receiving the sent traffic;
   receiving, at the supernode, a copy of the specified response received by the first agent; and
   analyzing a difference between the specified response and the copy of the response received by the first agent to detect one or more intermediate devices.

6. The method of claim 1, wherein inferring one or more intermediate devices comprises detecting one or more stealth intermediate devices hiding from detection and failing to respond to requests to identify themselves.

7. The method of claim 1, wherein the multiple agents are managed clients operating within an enterprise under control of a system administrator of the enterprise, each client having installed on it a same security program and also having installed on it a network detection sensor for performing the method of detecting devices in the subnetwork.

8. A non-transitory computer-readable storage medium storing executable computer program instructions for performing steps comprising:
   receiving, at a computer, an assignment to be a supernode managing multiple agents of a subnetwork;
   instructing a first agent of the multiple agents to send traffic, via the subnetwork, to a second agent of the multiple agents, the sent traffic having characteristics;
   receiving a copy of traffic received by the second agent, the received traffic having at least one different characteristic from the sent traffic;
   inferring one or more intermediate devices transmitting traffic between the first and second agents based on the at least one different characteristic between the sent traffic and the received traffic; and
   mapping the topology of the subnetwork including the one or more intermediate devices.

9. The computer-readable storage medium of claim 8, wherein mapping the topology further comprises modifying an existing map of a network topology to include the one or more intermediate devices inferred in the subnetwork.

10. The computer-readable storage medium of claim 8, wherein the supernode is an agent within a larger subnetwork of a higher-level supernode, and further comprising instructions for:
    receiving instructions from the higher-level supernode to perform a set of network traffic fingerprinting tests of the larger subnetwork;
    sending information across the larger subnetwork to one or more other agents in the larger subnetwork based on the instructions received, and receiving information in response; and
    providing results of the tests of the larger subnetwork to the higher-level supernode for inferring intermediate devices and mapping of a topology of the larger subnetwork.

11. The computer-readable storage medium of claim 8, further comprising instructions for:
    providing information regarding the detected one or more intermediate devices to a higher level supernode for modifying a topology of an overall network to include the one or more intermediate devices detected in the subnetwork.

12. The computer-readable storage medium of claim 8, further comprising instructions for:
    reporting, to a central management server, the inferred one or more intermediate devices;
    receiving from the central management server a plurality of dynamically-generated fingerprinting tests, the fingerprinting tests dynamically generated for an inferred intermediate device of a type that has not been reported before to the central management server; and
    instructing one or more of the multiple agents to perform the dynamically-generated fingerprinting tests to detect other intermediate devices of the type that had not been reported before to the central management server.

13. The computer-readable storage medium of claim 8, wherein the instructions for inferring one or more intermediate devices comprise instructions for:
    detecting at least two intermediate devices on the subnetwork;
    detecting a physical ordering sequence of the intermediate devices between the first and second agents; and
    detecting a specific make and model of each of the intermediate devices.

14. The computer-readable storage medium of claim 8, further comprising instructions for instructing the first and second agents to perform one or more individual agent data collection tests.

15. A computer system for mapping a topology of a subnetwork, the system comprising:
    a non-transitory computer-readable medium containing executable computer program instructions for:
      receiving, at the computer system, an assignment to be a supernode managing multiple agents of a subnetwork;
      instructing a first agent of the multiple agents to send traffic, via the subnetwork, to a second agent of the multiple agents, the sent traffic having characteristics;
      receiving a copy of traffic received by the second agent, the received traffic having at least one different characteristic from the sent traffic;
      inferring one or more intermediate devices transmitting traffic between the first and second agents based on the at least one different characteristic between the sent traffic and the received traffic; and
      mapping the topology of the subnetwork including the one or more intermediate devices; and
    a processor for executing the computer program instructions.

16. The system of claim 15, wherein the computer-readable medium includes further instructions for:
    instructing the first and second agents to apply traceroute to detect any layer 3 devices located between them; and
    instructing the first and second agents to send one or more address resolution protocol (ARP) requests to detect any layer 2 devices located between them.

17. The system of claim 15, wherein the computer-readable medium includes further instructions for instructing the multiple agents to perform tests selected from the group consisting of: a) instructing one agent to generate a false return Media Access Control (MAC) address and another agent to attempt to address packets to that address, b) instructing the multiple agents to generate a sequence of false MAC addresses to overflow an address table and to send a correctly addressed packet, and c) instructing the multiple agents to subject managed switches and network access devices to error conditions or flooding.

18. The system of claim 15, wherein the computer-readable medium includes further instructions for instructing the first and second agents to perform tests selected from the group consisting of: a) instructing the first and second agents to generate a series of packets delivered both in order and out of order, b) instructing the first and second agents to generate a series of overlapping packet fragments with one or more packet fragments defined to trigger a packet fragment disambiguation strategy, c) instructing the first and second agents to transmit a series of packets using different maximum transmission unit (MTU) values, d) instructing the first agent to send packets multiple times with different hop counts to the second agent, and e) instructing the first agent to present itself as a Simple Traversal of UDP through NAT (STUN) server and the second agent to initiate a STUN connection to the first agent.

19. The system of claim 15, wherein the computer-readable medium includes further instructions for instructing the multiple agents to perform tests involving communication between the first and second agents, the tests selected from the group consisting of: a) Internet Protocol Version 6 (IPv6) fingerprinting tests, b) tests for identifying Domain Name System (DNS) and security devices for DNS, c) Simple Mail Transfer Protocol (SMTP) fingerprinting tests, and d) tests for observing what Hypertext Transfer Protocol (HTTP) misuse is filtered by an intermediate device.

20. The system of claim 15, wherein the computer-readable medium includes further instructions for:
- detecting unmanaged switches on the subnetwork using one or more probes;
- determining which client systems are attached to which switches using at least one of the probes; and
- determining whether one or more switches and hubs are chained together in a series based on device latency tests.

* * * * *